United States Patent
Zang et al.

(10) Patent No.: US 11,166,547 B2
(45) Date of Patent: Nov. 9, 2021

(54) ADJUSTABLE SHELVING ASSEMBLY

(71) Applicant: HARBOR INDUSTRIES, INC., Grand Haven, MI (US)

(72) Inventors: Dathan Zang, Grand Haven, MI (US); Bill Parsons, Grand Haven, MI (US); Austin Fritz, Grand Haven, MI (US); Ron Kuperus, Grand Haven, MI (US)

(73) Assignee: Harbor Industries, Inc., Grand Haven, MI (US)

( * ) Notice: Subject to any disclaimer, the term of this patent is extended or adjusted under 35 U.S.C. 154(b) by 0 days.

(21) Appl. No.: 16/841,094

(22) Filed: Apr. 6, 2020

(65) Prior Publication Data

US 2020/0315342 A1 Oct. 8, 2020

Related U.S. Application Data

(60) Provisional application No. 62/829,873, filed on Apr. 5, 2019.

(51) Int. Cl.
*A47B 57/42* (2006.01)
*A47B 57/40* (2006.01)
*A47F 5/10* (2006.01)

(52) U.S. Cl.
CPC ............ *A47B 57/42* (2013.01); *A47B 57/402* (2013.01); *A47F 5/101* (2013.01)

(58) Field of Classification Search
CPC ....... A47B 57/42; A47B 57/402; A47F 7/145; A47F 5/103; A47F 5/101
USPC ................................... 248/407–409; 211/192
See application file for complete search history.

(56) References Cited

U.S. PATENT DOCUMENTS

| | | | | |
|---|---|---|---|---|
| 3,299,839 A | * | 1/1967 | Nordbak | A47B 57/42 108/152 |
| 3,346,126 A | * | 10/1967 | Bloom | A47B 57/50 211/192 |
| 3,353,507 A | * | 11/1967 | Squires | A47B 57/42 108/107 |
| 3,726,413 A | * | 4/1973 | Squires | A47B 57/402 108/107 |
| 3,858,988 A | * | 1/1975 | Cohen | F16B 9/02 403/18 |

(Continued)

*Primary Examiner* — Ko H Chan
(74) *Attorney, Agent, or Firm* — Gardner, Linn, Burkhart & Ondersma LLP (57) ABSTRACT

A shelving assembly includes a first and second support rail each including a plurality of slots. The assembly may further include a shelf configured to connect to the first and second support rails and a bracket connected thereto. The bracket includes a plurality of teeth arranged at a distal end of the bracket and facing away from the shelf. A leave spring may be connected to the shelf and extend from a connection point along a rear edge of the shelf to a side of the shelf. A locking tooth positioned at an end of the leave spring is configured to be inserted into a slot in the first or second support rail to lock the shelf in place. The shelving assembly may further include telescoping support rails. The support rails may be include front faces having slots therein. The front faces of the inner telescoping sections may be offset from the front faces of the outer telescoping sections. The assembly may include an extension bracket configured to connect to a front face of the inner telescoping sections and align with the front face of the outer telescoping sections.

12 Claims, 12 Drawing Sheets

(56) References Cited

U.S. PATENT DOCUMENTS

| | | | | |
|---|---|---|---|---|
| 4,129,279 A | * | 12/1978 | Burkholder | A01K 31/17 211/182 |
| 4,219,175 A | * | 8/1980 | Harig | A47B 45/00 248/125.3 |
| 4,351,244 A | * | 9/1982 | Suttles | A47B 47/024 108/107 |
| 4,460,097 A | * | 7/1984 | Darnell, II | A47F 7/145 211/189 |
| 4,535,704 A | * | 8/1985 | Suttles | A47F 5/103 108/108 |
| 4,842,311 A | * | 6/1989 | White | F16B 7/105 248/408 |
| 4,955,743 A | * | 9/1990 | King | A47B 57/50 403/254 |
| 5,439,123 A | | 8/1995 | Nook | |
| 7,175,034 B2 | | 2/2007 | Nook et al. | |
| 7,950,538 B2 | | 5/2011 | Zang et al. | |
| 9,084,485 B2 | * | 7/2015 | Sukman | A47B 96/06 |
| 9,339,108 B2 | | 5/2016 | Zang et al. | |
| 10,121,121 B1 | * | 11/2018 | De Bonet | A47B 57/34 |
| 10,888,179 B2 | | 1/2021 | Buck et al. | |
| 2017/0099961 A1 | * | 4/2017 | Church | A47B 96/028 |

* cited by examiner

ADJUSTABLE SHELVING ASSEMBLY

CROSS-REFERENCE TO RELATED APPLICATION

This application claims priority to U.S. Provisional Patent Application No. 62/829,873 filed on Apr. 5, 2019 and entitled ADJUSTABLE SHELVING ASSEMBLY, which is hereby incorporated by reference.

FIELD OF INVENTION

The field of invention relates generally to shelving and, more particularly, to brackets, shelves, and other devices for attachment to a support rail structure.

BACKGROUND

Shelving and racking structures for displaying retail goods require adjustability to fit unique retail spaces and display a variety of retail goods. Retail spaces have numerous size constraints that require flexibility and adaptability of shelving and racking display fixtures, such as gondolas. In some cases flexibility may be provided through modular units that may be stacked or combined laterally to fit a give space. However, these types of modular systems have drawbacks. First, modular systems are only adjustable in fixed increments equal to each modular unit, and therefore fine adjustability is not possible. Additionally, some retail spaces change within a given sales space and therefore require adjustment on the fly. For modular systems this can require buying new parts or pieces to fill a given space.

In many cases, retail shelving units and gondolas are fitted with trays to hold smaller retail products. The trays may be configured to fill the shelving space and provide a full look for customers viewing the retail product. Often times, tray sizes are such that a given retail space cannot be evenly filled to full capacity. In such cases the trays must be modified or left short from the desired tray length.

Accordingly, an improved shelving assembly is needed in the art.

SUMMARY

A shelving assembly is generally presented. The shelving assembly may comprise a first and second support rail each including a plurality of slots. The assembly may further include a shelf configured to connect to the first and second support rails. The shelf may include a bracket connected thereto. The bracket may include a plurality of teeth arranged at a distal end of the bracket and facing away from the shelf. The teeth may be configured to connect to the slots of the support rails. A leave spring may be connected to the shelf and extend from a connection point along a rear edge of the shelf to a side of the shelf. A first locking tooth may be positioned at an end of the leave spring and be configured to be inserted into a slot in the first or second support rail to lock the shelf in place.

In an embodiment, the shelf may include a bracket positioned at both of its lateral sides. The leaf spring may extend from the connection point in both directions to the sides of the shelf, and may include a locking tooth at each end. The locking teeth may be configured to engage the same slot as the top tooth in the plurality of teeth. The leaf spring may be biased away from the shelf to apply a force to the shelf and prevent removal of the shelf from the support rails unless the leave spring is first depressed.

In an embodiment, a shelving assembly includes a first and second telescoping support rails, each having an outer telescoping section and an inner telescoping section, the outer and inner telescoping sections each having a front face that includes a plurality of slots spaced apart. The front face of the first and second inner telescoping sections may be offset from the front face of the first and second outer telescoping sections. The assembly may further include an extension bracket configured to connect to the front face of the first or second inner telescoping section. The extension bracket may include a front wall having a plurality of slots therein and one or more tabs. The one or more tabs are configured to be inserted into the slots of the first or second inner telescoping section to align the front wall with the front face of the first or second outer telescoping section.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

An adjustable shelving assembly 10 is generally presented. The adjustable shelving assembly 10 is configured to display items, such as retail items, in a retail environment. The adjustable shelving assembly is further adjustable to create tailored spaces to fit the volume and size constraints of given retail items.

Figure 1:
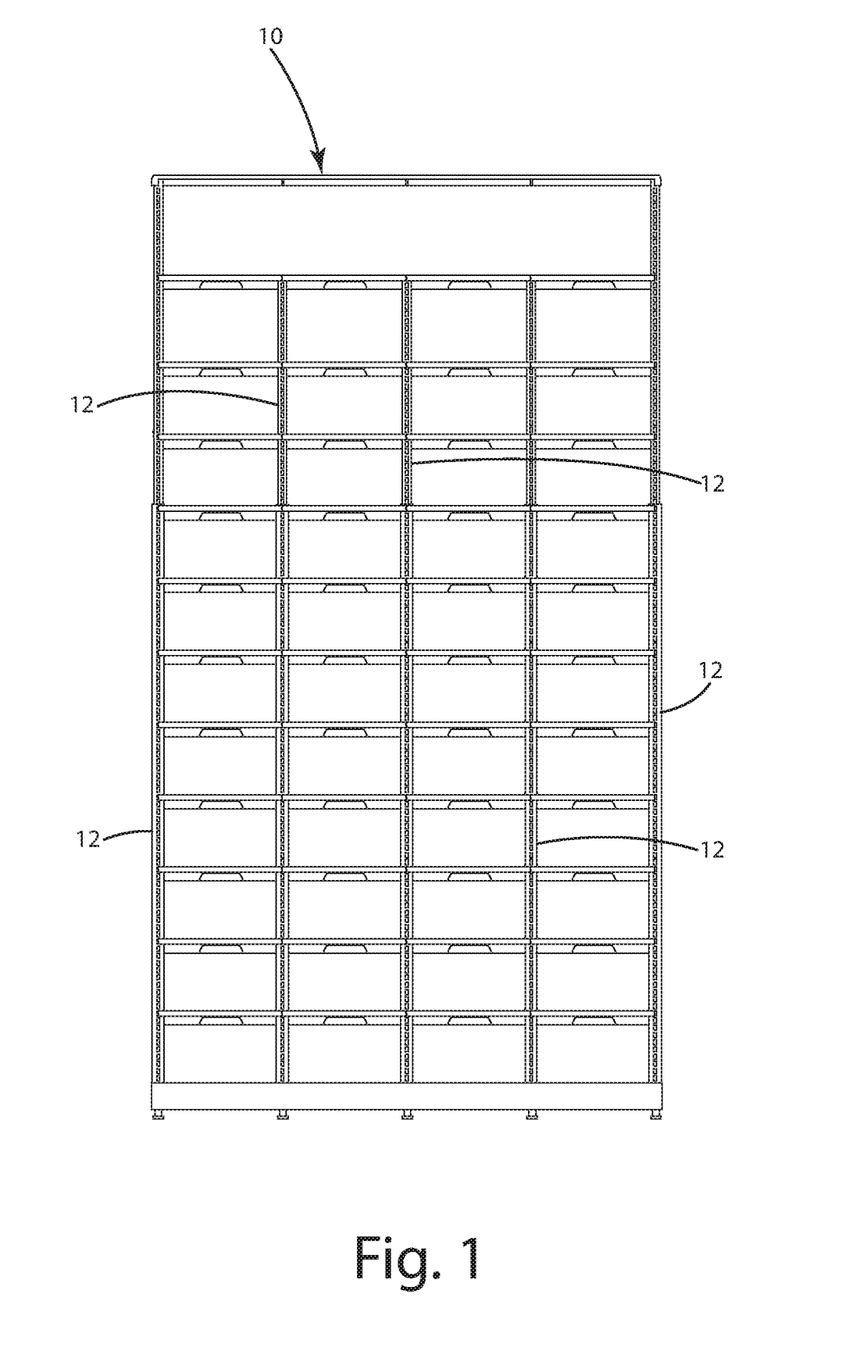
FIG. 1 illustrates a front view of a retail display shelving unit.

The adjustable shelf assembly 10 may include one or more generally vertical support rails 12, such as at least two spaced apart rails, or three or four or more rails such as shown in FIG. 1. Each support rail 12 includes a plurality of closely-spaced slots or apertures 14 formed through a front wall 16 of the rail 12. The slots 14 may be sized and shaped to receive tabs of a shelf 20, as described in further detail below. The slots 14 may be spaced apart vertically by a preset distance, such as a half of an inch from center to center of adjacent slots, to allow for selectable insertion of shelves at a desired height along the support rails 12.

Figure 2:
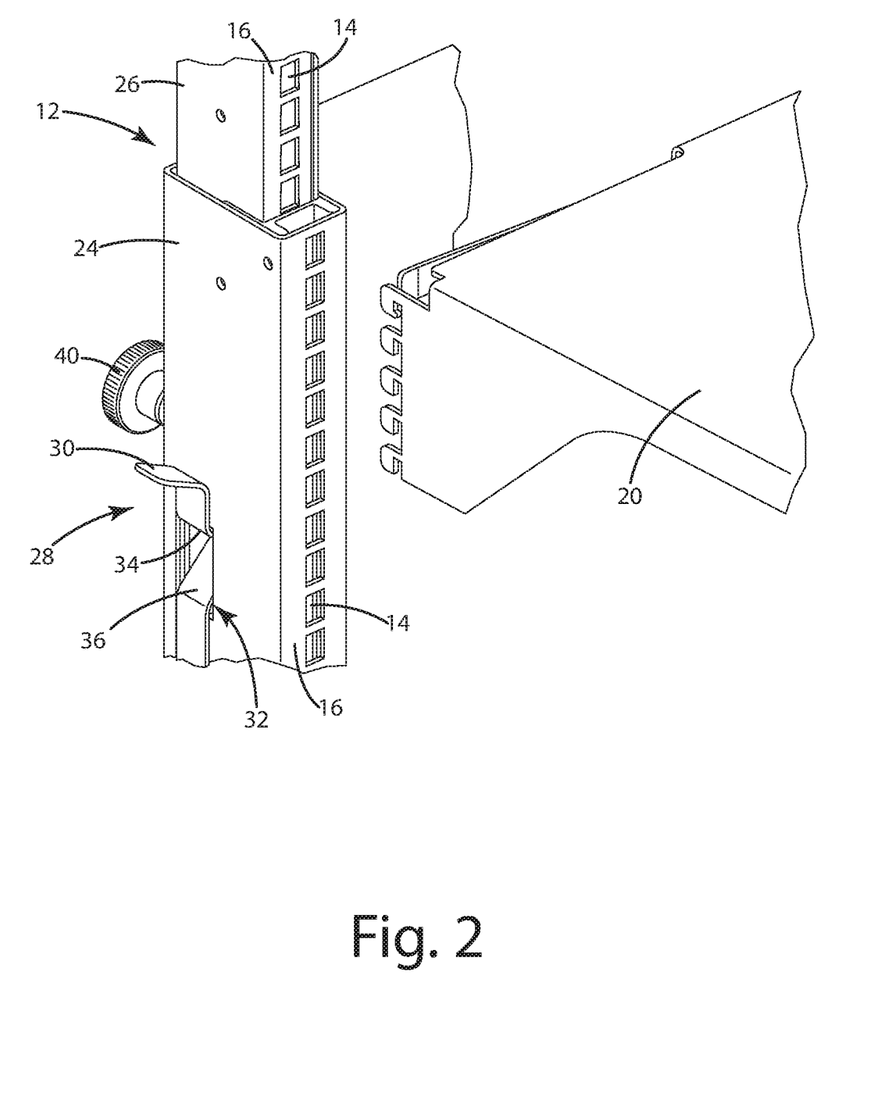
FIG. 2 illustrates an assembly view of a shelf and a telescoping support rail.
Figure 3A:
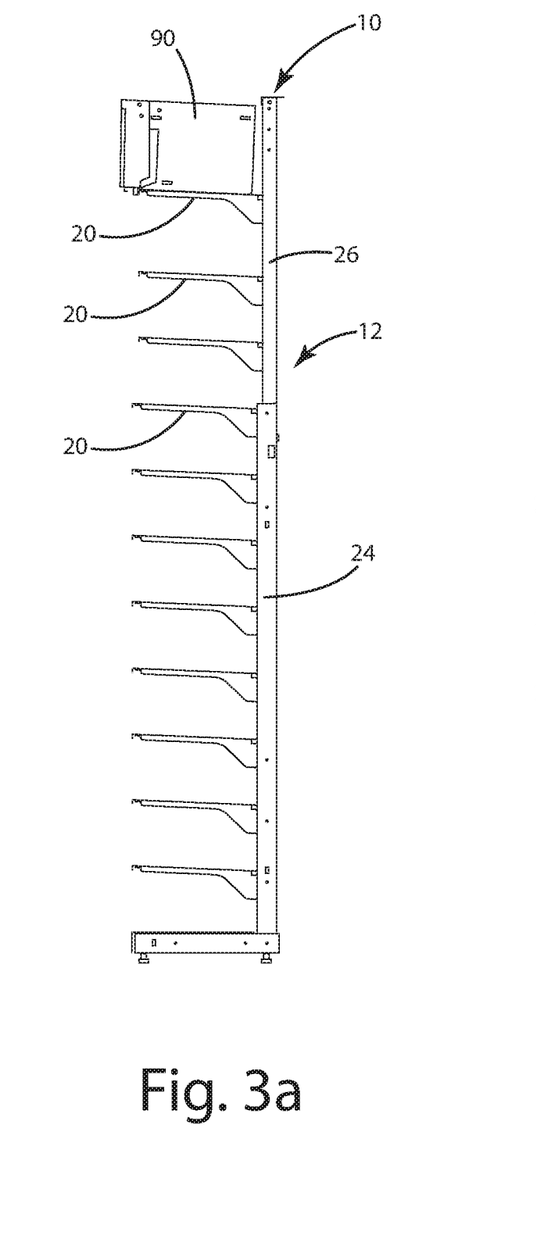
FIG. 3a illustrates a side view of a telescoping shelving unit in extended position.
Figure 3B:
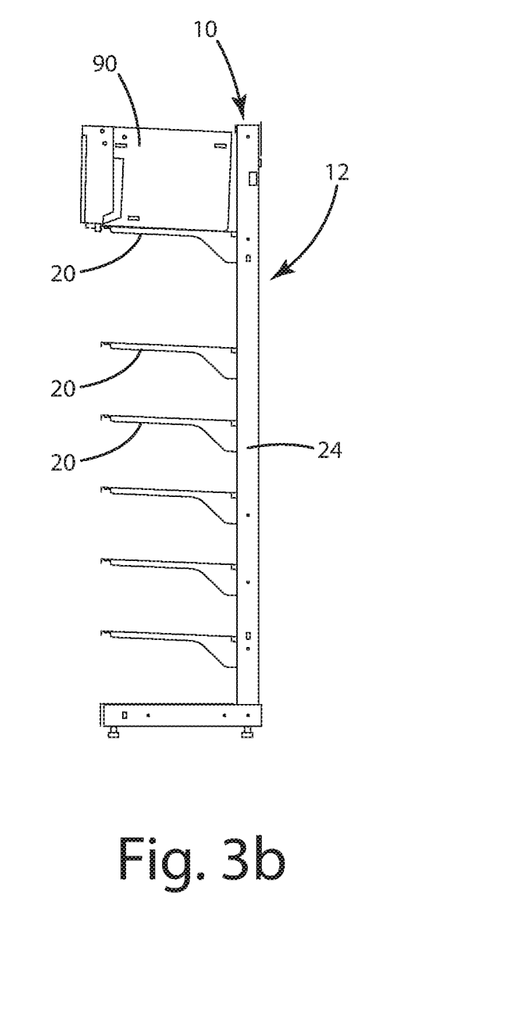
FIG. 3b illustrates a side view of a telescoping shelving unit in retracted position.
Figure 4A:
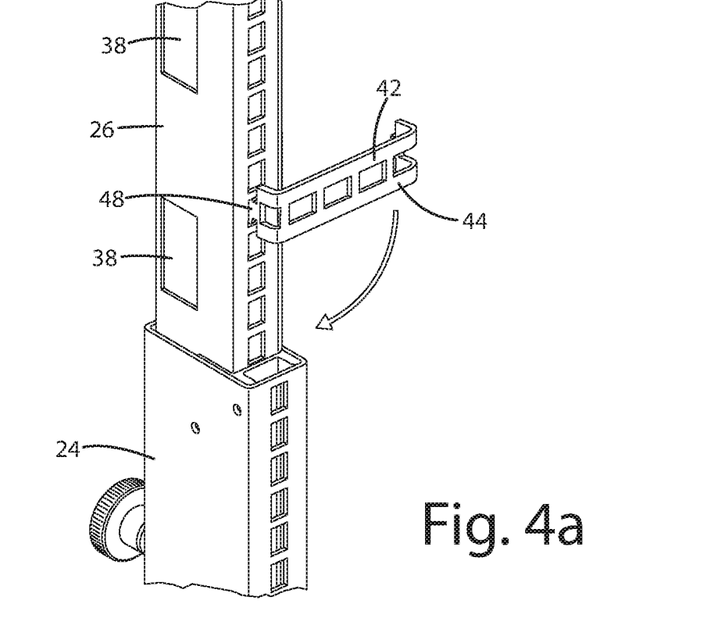
FIG. 4a illustrates a slot extension bracket inserted into an support rail slot in a horizontal position.
Figure 4B:
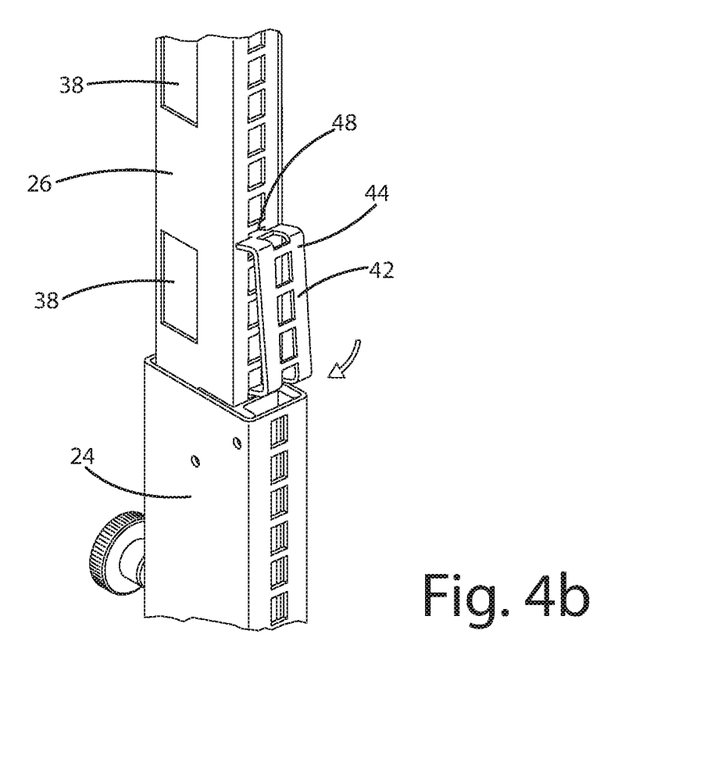
FIG. 4b illustrates a slot extension bracket inserted into an support rail slot and rotated into a vertical position.
Figure 4C:
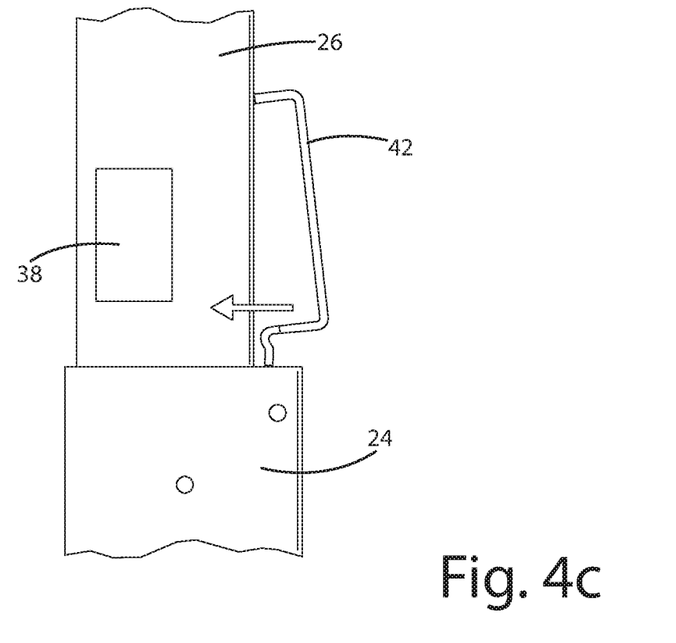
FIG. 4c illustrates a profile view of a slot extension bracket inserted into a telescoping support rail.
Figure 4D:
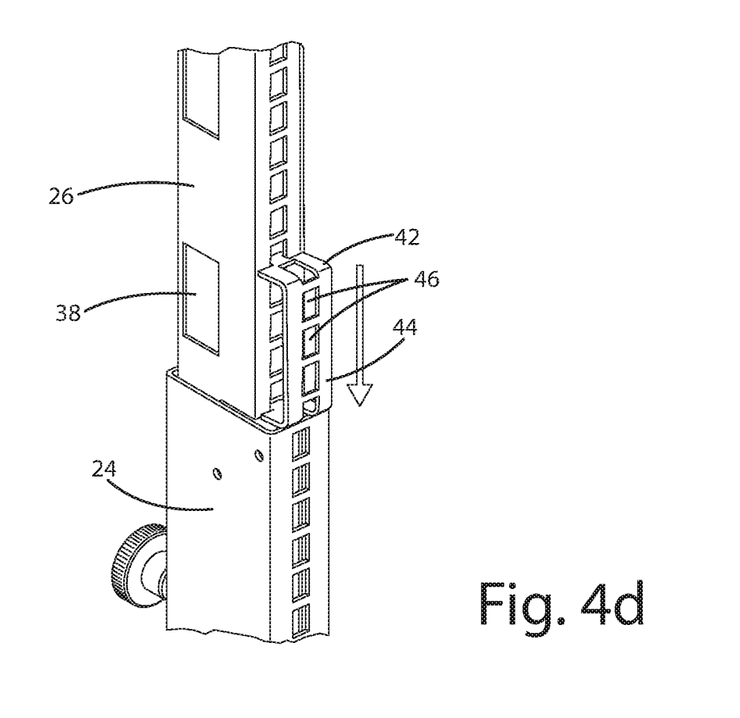
FIG. 4d illustrates a slot extension bracket inserted into a telescoping support rail and seated on a lower support rail.

The support rails 12 may be adjustable to a selected height. For example, as illustrated in FIGS. 2-4, the support rails 12 may include one or more telescoping sections 24, 26. A first outer telescoping section 24 includes a top opening that is sized and shaped to receive a second inner telescoping section 26 therein. Both the outer and inner telescoping sections 24, 26 include the slots or apertures 14 in their respective front walls 16, allowing connection of shelves along any front surface of the first or section sections 24, 26.

Each telescoping support rail 12 includes a height lock 28. The height lock 28 is configured to selectively lock the telescoping support rail 12 at a desired height. The height lock 28 comprises a stopper 30 aligned with and biased toward a window or opening 32 in a side wall of the outer telescoping support rail section 24. The stopper 30 includes a flat, generally horizontal section 34 and an angled section 36 extending downward from the flat section 34 at an angle greater than 90 degrees, as illustrated in FIG. 2. The inner telescoping section 24 includes a plurality of openings 38 intermittently spaced along a side wall. The openings 38 are positioned to align with the window 32 when the inner telescoping member is raised to an appropriate height. The openings 38 may be spaced at any appropriate distance apart to allow for selective height adjustment at intervals that correspond to the distance between the openings 38.

The window 32 and opening 38 may be sized to receive the stopper 30 therethrough when aligned, as illustrated in FIG. 2. The upper flat section 34 may act as a shelf or support to prevent the inner telescoping support rail 26 from dropping below the selected height. To lower the height of the support rail 12, the biased stopper 30 can be pulled back away from the support rail to a disengaged position until the stopper 30 is completely outside of the opening 38 to allow the inner support rail 26 to lower. To raise the height of the support rail 12, the biased stopper 30 does not need to be removed from the opening 38. Instead, when the inner telescoping support rail 26 is pulled upwards, the lower edge of the opening 38 pushes against the angled section 36 of the stopper 30 forcing the stopper 30 to move out of the opening and allowing the support rail 12 to be raised. In this manner, the support rail may be raised without actively removing the stopper 30 from the opening 38 but may not be lowered without removing the stopper 30 from the opening 38. This features acts as a safety protection to prevent unwanted drops in the shelves that may yield damage to products on the shelves.

A clamping knob 40 is positioned on a side or rear face of the upright along the outer telescoping support rail 24, as shown in FIG. 2. The clamping knob 40 is threaded and includes a bolt inserted through the outer telescoping support rail 24. When tightened, the clamping knob 40 adds an additional protection against the inner telescoping support rail 26 lowering or falling at unwanted times.

The adjustable shelving assembly 10 may include a slot extension bracket 42, as illustrated in FIGS. 4a-4d. As shown in FIG. 2, the front wall 16 of the inner telescoping support rail 26 is offset from the front wall 16 of the outer telescoping support rail 24. The slot extension bracket 42 may be configured to extend the front wall 16 of the inner telescoping support rail 26 to provide an even surface for a shelf 20 to be connected at the telescoping point.

The extension bracket 42 may comprise a front wall 44 having openings or slots 46 therein, consistent with the size and spacing of the slots 14 on the front wall 16 of the outer telescoping support rail 24. The extension bracket 42 may be bent back at the top and bottom and include a tab 48 at the top to be inserted into a slot 14 in the inner telescoping support rail 26. As shown in FIGS. 5a-5d, the extension bracket 42 may be turned horizontally to insert the tab 48 into the slot 14. The bracket 42 may then be rotated to the vertical and seated in the opening at the top of the outer support rail 24.

Figure 5:
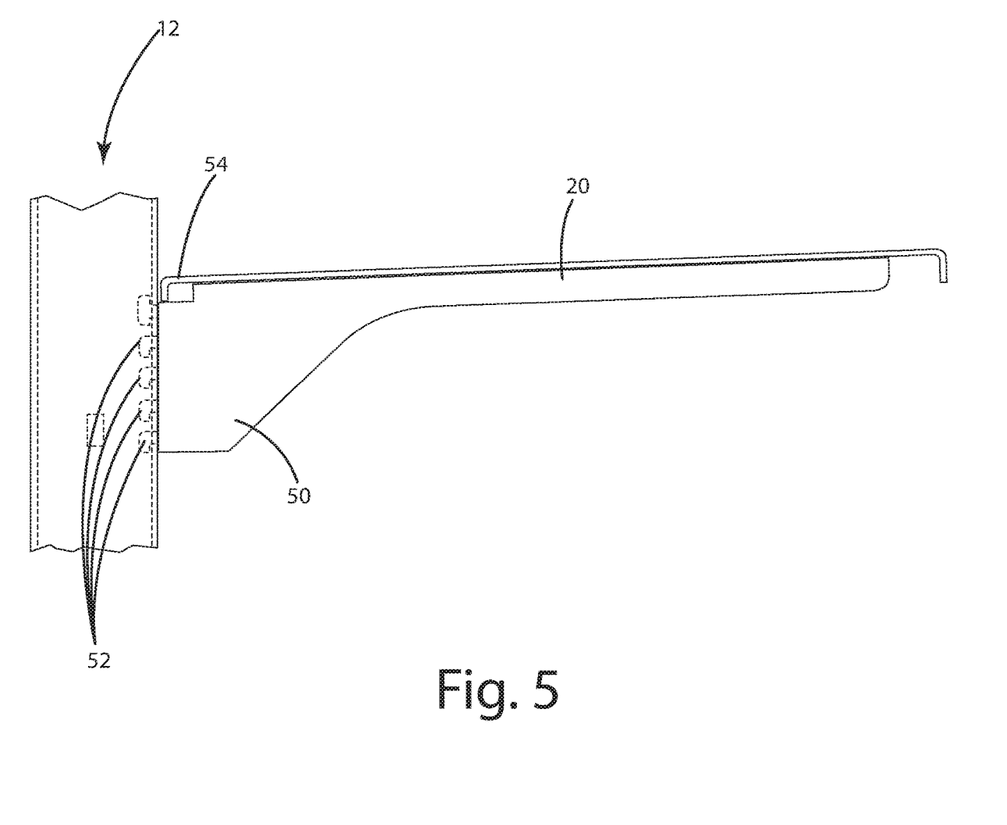
FIG. 5 illustrates a side see through view of a shelf connected to a shelving unit upright.
Figure 6:
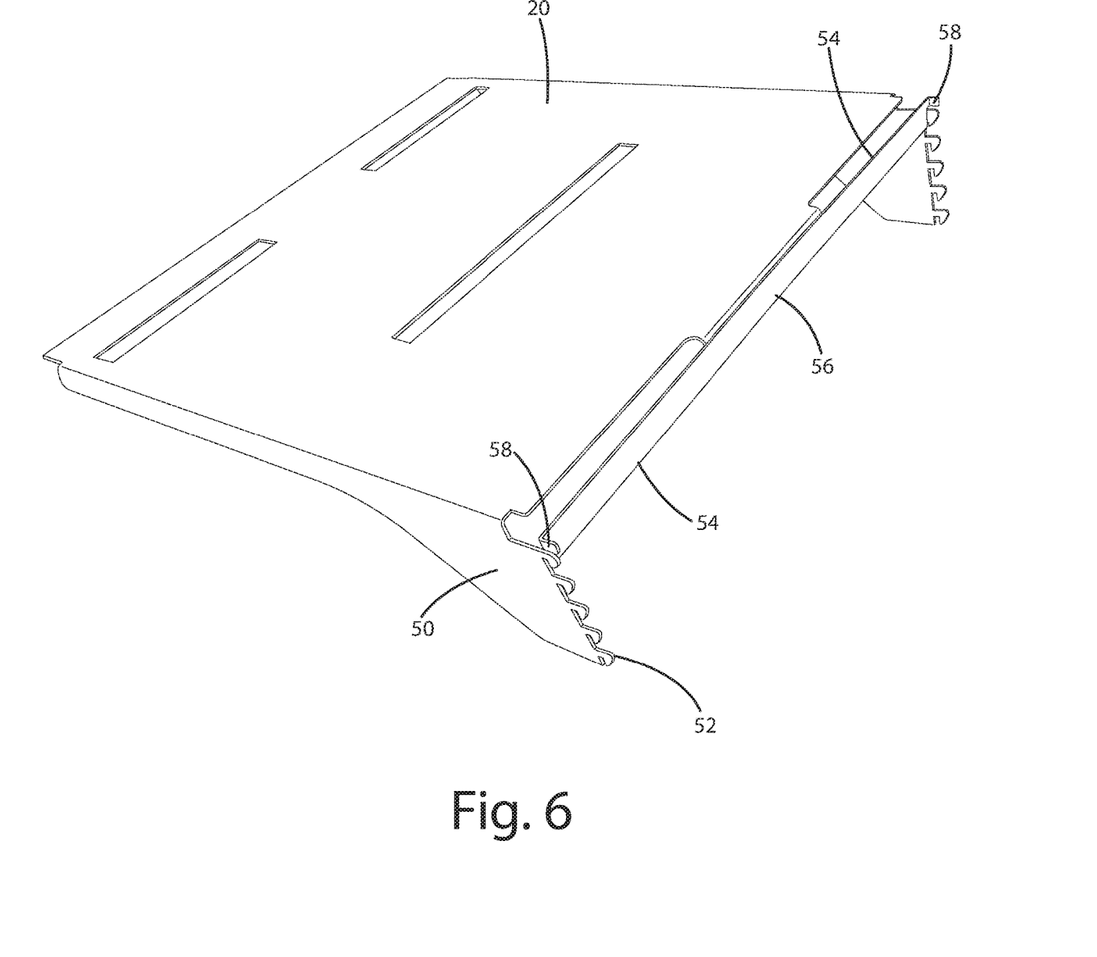
FIG. 6 illustrates a rear perspective view of a shelf having integrated brackets.
Figure 7:
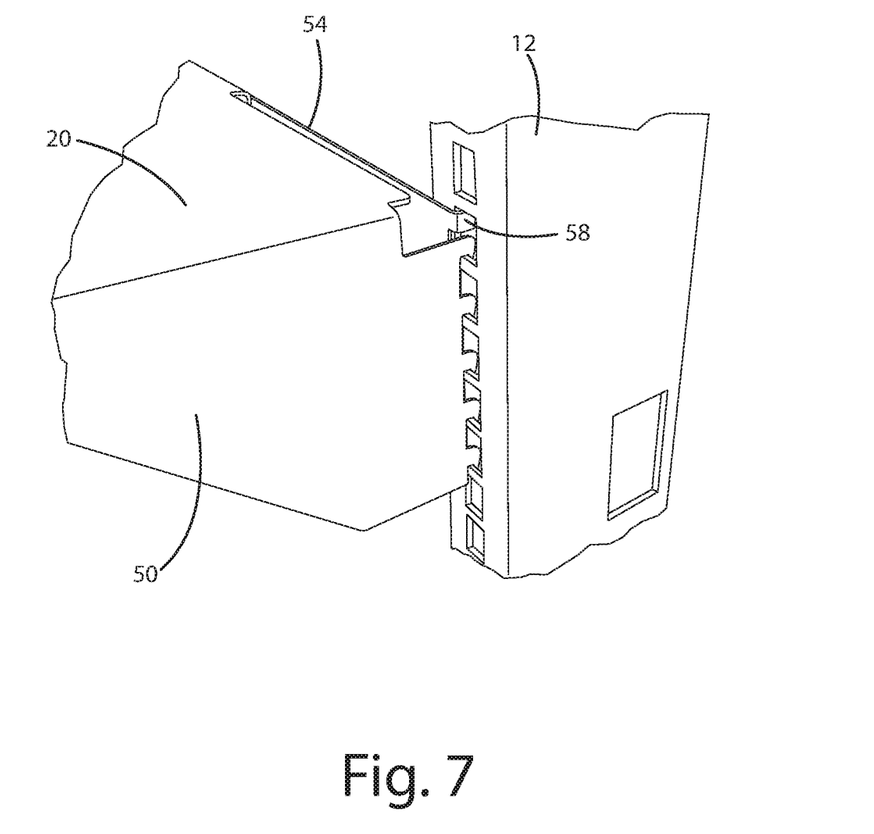
FIG. 7 illustrates a shelf having integrated brackets connected to a telescoping support rail.

The adjustable shelving assembly 10 includes a shelf 20, as illustrated in FIGS. 5-7. The shelf 20 may include an integrated bracket 50, as shown, or may be configured in separate pieces with an attachable bracket. The bracket 50 includes a plurality of rearward protruding teeth 52. The teeth 52 are configured to engage the slots 14 of the telescoping uprights 12 to secure the shelf 20 into its desired position. The teeth 52 may each comprise a rearward protrusion away from the shelf, and a downward protrusion, so as to engage a slot 14 and prevent removal of the shelf 20 from the support rail 12 unless it is raised.

As illustrated in FIGS. 5-7 the shelf 20 may include a leaf spring 54 positioned near a rear edge of the shelf 20. The leaf spring 54 is connected to a central or base portion 56 at the rear edge of the shelf 20 and extends, in an unconnected manner, outward on both sides away from the base portion 56 and towards the brackets 50. The base portion 56 may comprise a flange extending downward from a rear edge of the shelf 20. In its relaxed state, the leaf spring 54 may project slightly rearward from the back edge of the shelf 20 such that it provides an opposing force against the front wall of the support rail 12 when a shelf 20 is attached thereto. The force of the leaf spring 54 may position the shelf 20 in an outward most position to ensure that the teeth 52 are abutted against the inside of the front wall 16.

The leaf spring 54 may include a locking tooth 58 protruding rearward from each outer edge and generally aligned with and shaped like the teeth 52 on the bracket 50. The locking tooth 58 is further aligned to be inserted into the same slot 14 as the top bracket tooth 52. As best shown in FIG. 7, the locking tooth 58 and top bracket tooth 52 may both be inserted into the same slot, with the locking tooth 58 on top. The locking tooth 58 prevents the shelf 20 from being raised while the locking tooth is engaged with the slot 14. To disengage the shelf 20, the leaf spring 54 may be depressed inward toward the shelf 20 to remove the locking tooth 58 from the slot 14. The shelf 20 may then be raised and removed from the respective slots 14.

Figure 8:
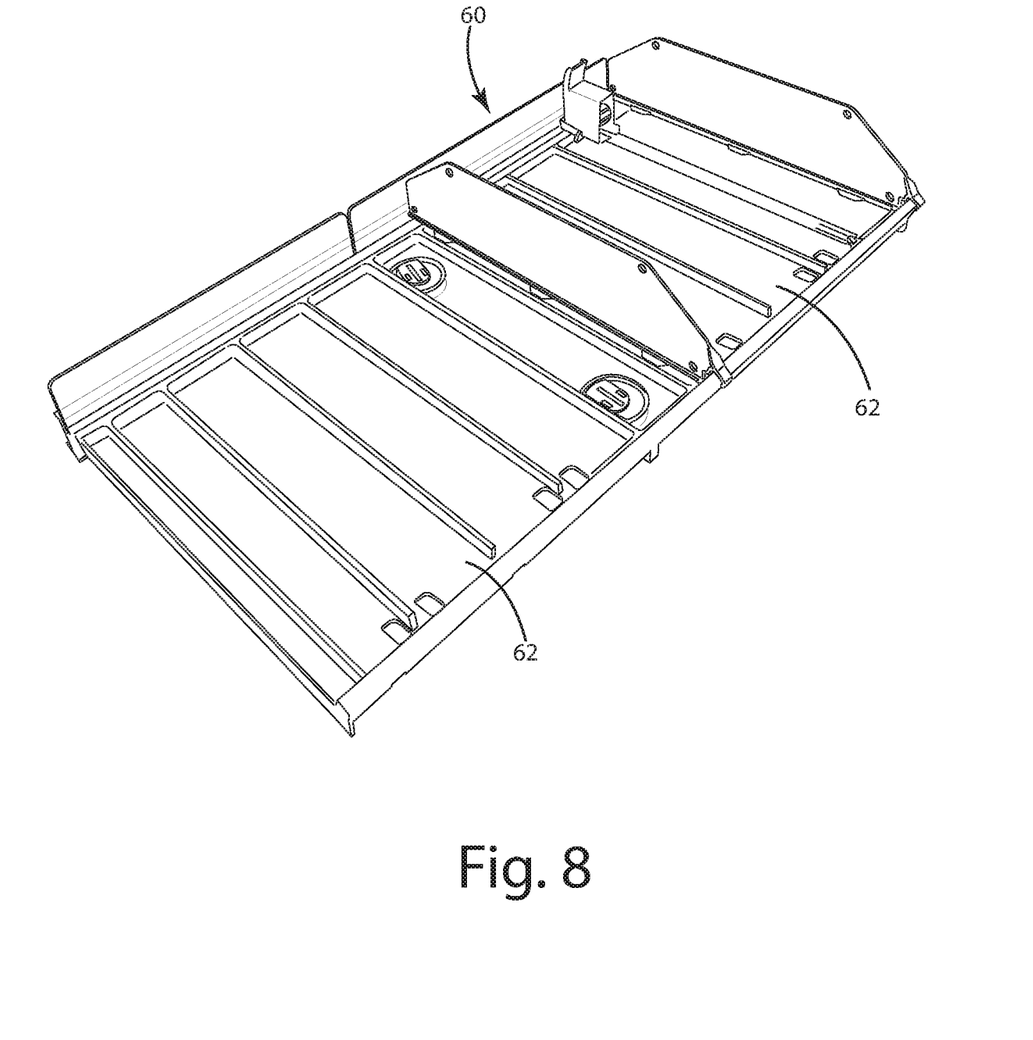
FIG. 8 illustrates a tray assembly.
Figure 9:
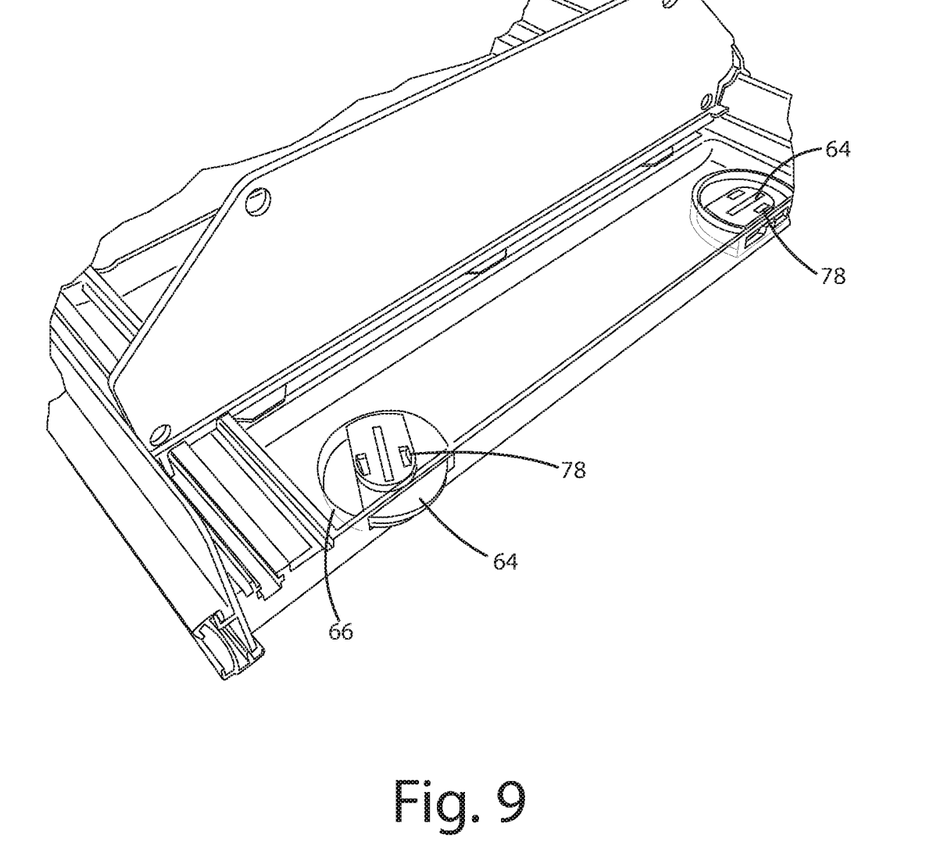
FIG. 9 illustrates a first tray having a pair of clamping discs therein.
Figure 10:
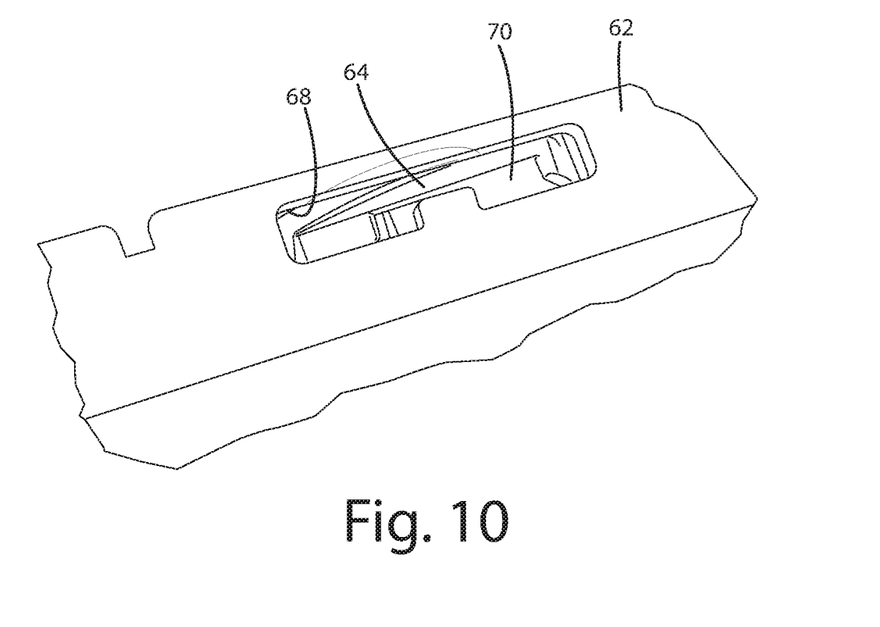
FIG. 10 illustrates a side view of a clamping disc.

In an embodiment illustrated in FIGS. 8-10 the adjustable shelving assembly 10 includes a modular tray assembly 60. The tray assembly 60 may include one or more trays 62 configured to hold and display retail products on a shelving assembly 10. The trays 62 may be connected together in a novel manner, as described in further detail below.

The tray assembly 60 may include trays 62 of various sizes connected together to fill a given shelving space or to provide a given amount of space to showcase a given retail item. For example, a small retail item, such as a tobacco product, may require 18 inches of retail space on a shelving unit for display. Standard trays may come in sizes of only 12 inches and therefore may be unable to provide the desired 18 inches of retail space. The modular tray assembly may allow for connectability of a 12 inch tray and a 6 inch tray to form the desired 18 inches of tray.

As shown in FIG. 9, a first tray 62 includes one or more clamping discs 64 arranged along an edge of the tray 62. The clamping discs 64 may be generally circular and positioned within a similarly shaped circular slot 66 in the tray 62. The clamping disc 64 and slot 66 may each include a flat surface along the edge of the tray 62. The slot 66 may include an opening 68 in the outer edge of the tray 62, as shown in FIG. 10. The clamping disc 64 may be configured to rotate within the slot 66 such that a portion of the clamping disc 64 is exposed outside of the opening 68 when rotated.

As shown in FIG. 10, the clamping disc 64 includes a tapered opening 70 along a portion of its underside and laterally disposed through a portion of the clamping disc 64. The tapered opening 70 is tapered such that the opening is wide along the flat portion of the clamping disc 64 and narrows down as it curves around the disc 64.

Figure 11:
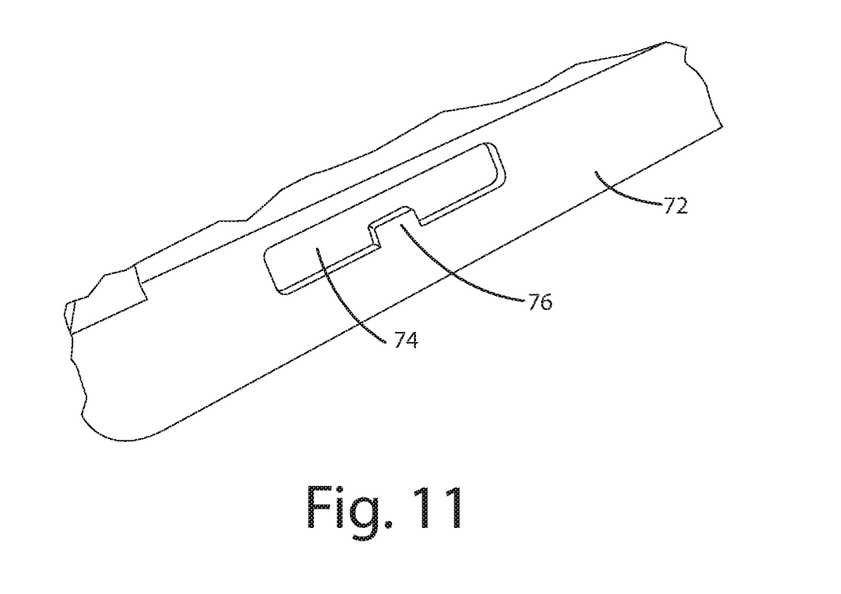
FIG. 11 illustrates a side view of a second tray having an opening with a projection.

The clamping disc 64 may be configured to engage and lock to an adjacent second tray 62. The second tray 62 may include a side wall 72 positioned against an edge of the first tray 62. The sidewall 72 includes an opening 74 therein as shown in FIG. 11. The opening 74 may be rectangular in shape, matching the cross-section of the clamping disc 64 in both shape and size. The opening 74 may include a projection 76 along its lower edge. The projection 76 may extend upwards into the opening 74.

In use, the first and second trays 62 may be connected together by abutting the edge of the first tray with the sidewall 72 of the second tray and aligning the opening 74 with the slot 66. The clamping disc 64 may be rotated to engage the tapered opening 70 with the projection 76 to lock the trays 62 together. The clamping disc 64 may include one or more slits 78 disposed along a top surface of the disc and configured to receive a key or item therein to facilitate rotation. When rotated, the clamping disc 64 engages the projection 76 to clamp the first and second trays 62 together. As the clamping disc 64 is rotated, the tapered opening 70 surrounds and clamps the projection 76 pulling the two trays 62 together. To release the connected trays 62, the clamping disc 64 may be rotated in an opposite direction.

Figure 12:
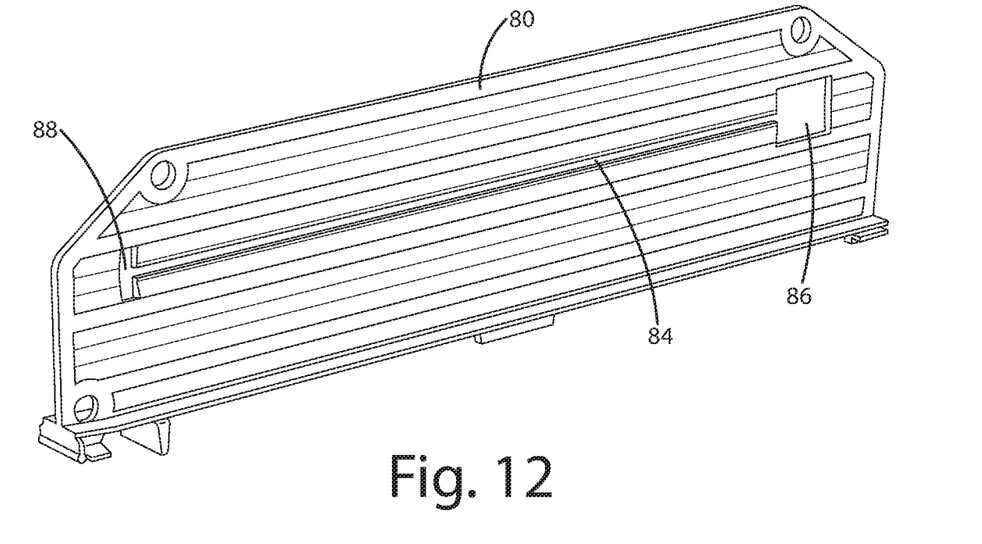
FIG. 12 illustrates a perspective view of a tray divider having a slot to receive an integrated pusher.
Figure 13:
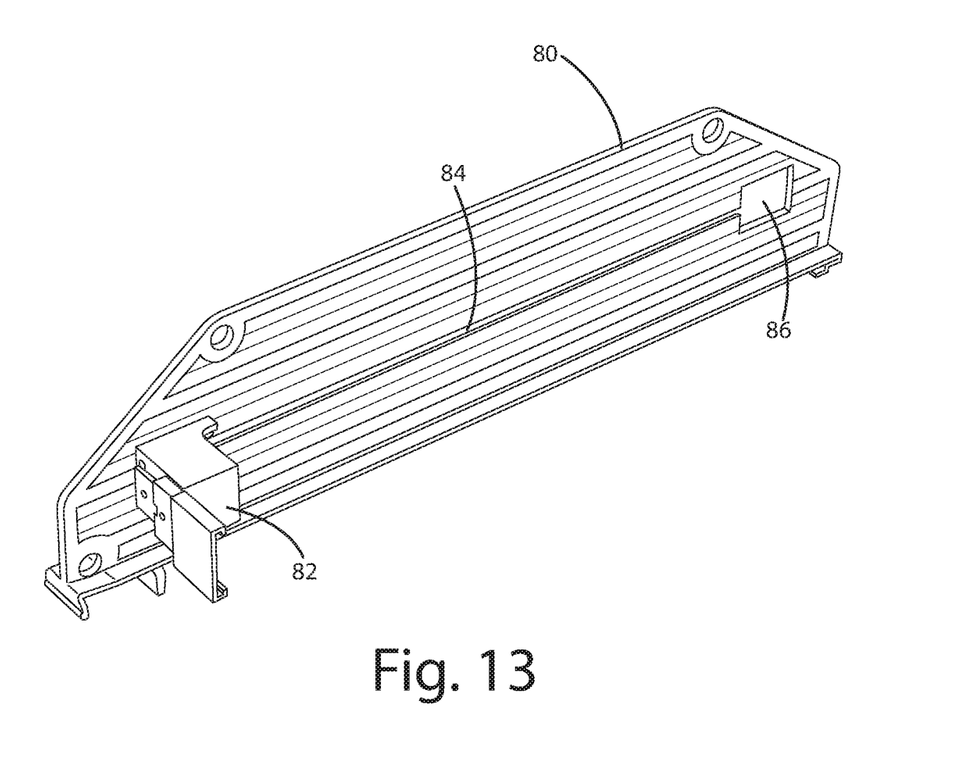
FIG. 13 illustrates a perspective view of a tray divider having an integrated side pusher connected thereto.

In an embodiment illustrated in FIGS. 12 and 13, the tray 62 may include a divider 80 configured to receive an integrated side pusher 82. The side pusher 82 may generally be similar to a pusher that is connected to the base of the tray 62. As shown, the divider 80 may include a slot 84 configured to receive the pusher therein. The slot 84 may extend from a rear access opening 86 to a front end 88. The slot 84 may allow movement of the pusher 82 laterally along the vertical face of the divider 80.

The pusher 82 may be biased toward the front end 88. For example, the pusher 82 may be connected to a point at or near the front end 88 by a spring or other biasing device. The biasing device (not shown) may allow for movement and travel of the pusher 82 within the slot 84 while creating a biasing force to move the pusher 82 forward when product is removed from the tray 62.

The integrated pusher 82 may include numerous advantages over known pusher arrangements. Specifically, the integrated pusher 82 may provide a space savings by reducing the space necessary for inserting a pusher 82 into the tray 62. In addition, the integrated pusher 82 may provide an easier and quicker assembly than other known pushers.

In an embodiment illustrated in FIGS. 3a and 3b, the shelving assembly 10 may include a header 90. Unlike traditional headers that are connected directly to the uprights or support rails, the header 90 may be connected to or supported by a shelf 20. This header design may provide numerous benefits over standard header configurations. First, the shelf supported header 90 may be height adjustable based on the adjustability of the shelf 20 and not the upright or support rail 12. This may allow for more fine adjustment options with respect to the height of the header 90. Further, the shelf supported header 90 may allow for customizable sizes, specifically widths, of headers 90 to be supported on the shelf which in turn may allow for headers to be arranged in a manner that are customized to the product under which they are positioned.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A shelving assembly comprising:
a first support rail having a plurality of slots;
a second support rail have a plurality of slots;
a shelf configured to connect to the first and second support rails;
a bracket connected to the shelf, the bracket including a plurality of teeth arranged at a distal end of the bracket and facing away from the shelf, wherein the teeth are configured to connect to the slots;
a leaf spring connected to the shelf, the leaf spring extending from a connection point along a rear edge of the shelf to a side of the shelf;
a first locking tooth connected to the leaf spring; and
wherein the first locking tooth is configured to be inserted into a slot in the first or second support rail to lock the shelf in place, and wherein the first locking tooth is configured to connect to the same slot as the top tooth of the plurality of teeth.

2. The shelving assembly of claim 1, wherein the leaf spring extends from the connection point along the rear edge of the shelf to both sides of the shelf.

3. The shelving assembly of claim 2, further comprising a second locking tooth positioned on the side of the shelf opposite the first locking tooth.

4. The shelving assembly of claim 1, wherein the leaf spring is biased away from the shelf.

5. The shelving assembly of claim 1, wherein the shelf is configured to be disconnected from the first and second support rails by depressing the leaf spring and lifting the shelf to remove the plurality of teeth from their respective slots.

6. The shelving assembly of claim 1, further comprising a second bracket connected to the shelf, wherein the second bracket is connected on a side of the shelf opposite the first bracket, and wherein the second bracket includes a second plurality of teeth arranged at a distal end of the second bracket and facing away from the shelf, wherein the second plurality of teeth are configured to connect to the slots of the second support rail.

7. A shelving assembly comprising:
- a first telescoping support rail having an outer telescoping section and an inner telescoping section, the outer and inner telescoping section having a front face that includes a plurality of slots spaced apart;
- a second telescoping support rail having a second outer telescoping section and a second inner telescoping section, the second outer and inner telescoping section having a front face that includes a plurality of slots spaced apart;
- wherein the front face of the first and second inner telescoping sections is offset from the front face of the first and second outer telescoping sections;
- an extension bracket configured to connect to the front face of the first or second inner telescoping section, wherein the extension bracket comprises a front wall having a plurality of slots therein and one or more tabs, and wherein the one or more tabs are configured to be inserted into the slots of the first or second inner telescoping section to align the front wall with the front face of the first or second outer telescoping section.

8. The shelving assembly of claim 7, wherein the first and second support rails include a height lock positioned along a side of the support rail other than the front face.

9. The shelving assembly of claim 8, wherein the height lock comprises: a plurality of openings spaced along a side of the first or second inner telescoping section; a window positioned along a side of the first or second outer telescoping section, wherein the window is configured to align with one of the plurality of openings when moved into vertical alignment; and a stopper biased into the window and moveable between an engaged and disengaged positions, wherein the stopper is configured to prevent telescoping movement of the first or second telescoping support rails when engaged position.

10. The shelving assembly of claim 9, wherein the stopper includes an angled portion configured to allow the stopper to be displaced to disengaged position when the inner telescoping section is moved away from the outer telescoping section.

11. The shelving assembly of claim 10, wherein the stopper includes a flat section configured to prevent lowering of the inner telescoping section toward the outer telescoping section when the stopper is in engaged position.

12. The shelving assembly of claim 7 further comprising a header, wherein the header is supported on a shelf.

* * * * *